US011872589B2

United States Patent
Pierce

(10) Patent No.: US 11,872,589 B2
(45) Date of Patent: *Jan. 16, 2024

(54) CORROSION RESISTANT WHEELS, ANTICORROSION LAYERS ASSOCIATED WITH WHEELS, AND METHODS FOR MANUFACTURING THE SAME

(71) Applicant: Phil Pierce, Muskegon, MI (US)

(72) Inventor: Phil Pierce, Muskegon, MI (US)

(73) Assignee: PRP Industries, Inc., Muskegon, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,314

(22) Filed: Jun. 28, 2022

(65) Prior Publication Data

US 2022/0339666 A1 Oct. 27, 2022

Related U.S. Application Data

(63) Continuation of application No. 16/381,028, filed on Apr. 11, 2019, now Pat. No. 11,369,989, which is a continuation of application No. 15/379,916, filed on Dec. 15, 2016, now Pat. No. 10,307,787.

(60) Provisional application No. 62/267,603, filed on Dec. 15, 2015.

(51) Int. Cl.
| | |
|---|---|
| *B05D 1/36* | (2006.01) |
| *B21D 53/26* | (2006.01) |
| *B60B 3/00* | (2006.01) |
| *B05D 3/12* | (2006.01) |
| *B05D 5/00* | (2006.01) |
| *C23C 28/00* | (2006.01) |
| *B05D 7/00* | (2006.01) |

(52) U.S. Cl.
CPC ............... *B05D 1/36* (2013.01); *B05D 3/12* (2013.01); *B05D 5/00* (2013.01); *B60B 3/00* (2013.01); *C23C 28/00* (2013.01); *B05D 7/51* (2013.01); *B05D 2202/00* (2013.01); *B21D 53/26* (2013.01); *B60B 2310/234* (2013.01); *B60B 2310/60* (2013.01); *B60B 2310/616* (2013.01); *B60B 2310/654* (2013.01); *B60B 2360/32* (2013.01); *B60B 2900/211* (2013.01)

(58) Field of Classification Search
None
See application file for complete search history.

(56) References Cited

U.S. PATENT DOCUMENTS

| | | | |
|---|---|---|---|
| 3,579,783 A | 5/1971 | Hayes et al. | |
| 3,986,997 A | 10/1976 | Clark | |
| 4,117,345 A | 9/1978 | Balcom | |
| 4,243,430 A | 1/1981 | Sperry et al. | |
| 4,305,622 A | 12/1981 | Mitchell | |
| 4,407,899 A | 10/1983 | Hara et al. | |

(Continued)

OTHER PUBLICATIONS

PCT Written Opinion of the International Searching Authority for International Application No. PCT/US16/066948 dated Mar. 16, 2017.

*Primary Examiner* — Michael P. Rodriguez
(74) *Attorney, Agent, or Firm* — King & Partners, PLC

(57) ABSTRACT

The present invention is directed to a method for manufacturing a corrosion resistant wheel adapted for securement to a vehicle and/or trailer, including the steps of: providing a wheel body, applying a primary anticorrosion composition, and forming a primary anticorrosion layer.

2 Claims, 7 Drawing Sheets

(56) References Cited

U.S. PATENT DOCUMENTS

| | | | |
|---|---|---|---|
| 4,421,821 A | 12/1983 | Matsubara et al. | |
| 4,435,219 A | 3/1984 | Greigger | |
| 4,444,601 A | 4/1984 | Greene | |
| 4,607,892 A | 8/1986 | Payne et al. | |
| 4,644,285 A | 2/1987 | Britton | |
| 4,732,787 A | 3/1988 | Vantillard et al. | |
| 4,763,392 A | 8/1988 | Fogal et al. | |
| 4,795,492 A | 1/1989 | Othen | |
| 4,895,887 A | 1/1990 | Daimon et al. | |
| 4,956,610 A | 9/1990 | Galm et al. | |
| 5,001,173 A | 3/1991 | Anderson et al. | |
| 5,051,278 A | 9/1991 | Paz-Pujaet | |
| 5,164,430 A * | 11/1992 | Hattori | C09D 5/4492 525/111 |
| 5,283,121 A | 2/1994 | Bordner | |
| 5,302,414 A | 4/1994 | Alkhimor et al. | |
| 5,334,235 A | 8/1994 | Dorfman et al. | |
| 5,413,407 A | 5/1995 | Warner | |
| 5,427,863 A | 6/1995 | Siebert | |
| 5,922,466 A | 7/1999 | Angelopoulous et al. | |
| 6,254,980 B1 | 7/2001 | Tadokoro et al. | |
| 6,258,417 B1 | 7/2001 | Goswami et al. | |
| 6,290,032 B1 | 9/2001 | Patrick et al. | |
| 6,344,237 B1 | 2/2002 | Kilmer et al. | |
| 6,358,397 B1 | 3/2002 | Lyublinski | |
| 6,365,222 B1 | 4/2002 | Wagner et al. | |
| 6,551,664 B2 | 4/2003 | Kaufold et al. | |
| 6,656,607 B1 | 12/2003 | Rouquier et al. | |
| 6,669,897 B1 | 12/2003 | Havenski et al. | |
| 6,753,094 B1 | 2/2004 | Wittebrood | |
| 6,702,886 B2 | 3/2004 | Whittle et al. | |
| 6,872,425 B2 * | 3/2005 | Kaufold | C23C 24/04 301/95.101 |
| 6,881,491 B2 | 4/2005 | Jankosky et al. | |
| 8,329,003 B2 | 12/2012 | Song | |
| 8,419,139 B2 | 4/2013 | Kaufold et al. | |
| 10,307,787 B2 | 6/2019 | Pierce | |
| 11,369,989 B2 | 6/2022 | Pierce | |
| 2009/0156736 A1 * | 6/2009 | Fischer | C09D 133/064 106/14.05 |
| 2009/0162544 A1 | 6/2009 | Garesche et al. | |
| 2010/0015467 A1 | 1/2010 | Zimmerman et al. | |
| 2012/0199495 A1 | 8/2012 | Song | |

\* cited by examiner

CORROSION RESISTANT WHEELS, ANTICORROSION LAYERS ASSOCIATED WITH WHEELS, AND METHODS FOR MANUFACTURING THE SAME

CROSS-REFERENCE TO RELATED APPLICATIONS

This application is a continuation of U.S. patent application Ser. No. 16/381,028, filed Apr. 11, 2019, entitled "Corrosion Resistant Wheels, Anticorrosion Layers Associated with Wheels, and Methods for Manufacturing the Same," now U.S. Pat. No. 11,369,989, which is a continuation of U.S. patent application Ser. No. 15/379,916, filed Dec. 15, 2016, entitled "Corrosion Resistant Wheels, Anticorrosion Layers Associated with Wheels, and Methods for Manufacturing the Same," now U.S. Pat. No. 10,307,787, which claims the benefit of U.S. Provisional Application Ser. No. 62/267,603, filed Dec. 15, 2015, entitled "Novel Wheels, Anticorrosion Layers Associated With Wheels, And Methods For Manufacturing The Same," all of which are hereby incorporated herein by reference in their entirety— including all references and appendices cited therein.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to wheels and, more particularly, to novel corrosion resistant drive, steer, and trailer wheels and associated films and/or layers. The present invention further relates to methods for manufacturing these wheels.

2. Background Art

Corrosion resistant compositions and associated products have been known in the art for years and are the subject of a plurality of patents and/or publications, including, for example: United States Patent Application Publication No. 2010/0015467 entitled "Method For Coating A Substrate And Coated Product," United States Patent Application Publication No. 2009/0162544 entitled "Method Of Surface Coating To Enhance Durability Of Aesthetics And Substrate Component Fatigue," U.S. Pat. No. 8,419,139 entitled "Tank Wheel Assembly With Wear Resistant Coating," U.S. Pat. No. 6,881,491 entitled "Protective Fluoride Coatings For Aluminum Alloy Articles," U.S. Pat. No. 6,872,425 entitled "Coated Vehicle Wheel And Method," U.S. Pat. No. 6,656,607 entitled "Method For Anticorrosive Coating And Treatment Of Metal Parts," U.S. Pat. No. 5,283,121 entitled "Corrosion And Abrasion Resistant Industrial Roll Coating With Non-Sticking Properties," U.S. Pat. No. 4,895,887 entitled "Coating Composition And Wheel Coated With The Same For Vehicles," and U.S. Pat. No. 4,763,392 entitled "Method Of Manufacturing A Totally Coated Tire Rim," all of which are hereby incorporated herein by reference in their entirety—including all references cited therein.

United States Patent Application Publication No. 2010/0015467 appears to disclose a method of applying coatings to surfaces, wherein a gas flow forms a gas-powder mixture with a powder of a material selected from the group consisting of niobium, tantalum, tungsten, molybdenum, titanium, zirconium, nickel, cobalt, iron, chromium, aluminum, silver, copper, mixtures of at least two thereof or their alloys with at least two thereof or with other metals, the powder has a particle size of from 0.5 to 150 μm, an oxygen content of less than 500 ppm oxygen and a hydrogen content of less than 500 ppm, wherein a supersonic speed is imparted to the gas flow and the jet of supersonic speed is directed onto the surface of an object. The coatings prepared are used, for example, as corrosion protection coatings.

United States Patent Application Publication No. 2009/0162544 appears to disclose a method for surface coating products, especially vehicle wheels, to improve the durability of their aesthetics and structural integrity via increased resistance to impact, abrasion, soil (e.g., brake dust), corrosion and fatigue stresses. The method comprises applying a uniform clear coating layer to the surface of the substrate, and then applying a preceramic resin film to the coated substrate, where the preceramic resin film is uniformly applied and cured onto the coated substrate so as to result in a ceramic shell of about 3 microns to about 12 microns in thickness over the coated substrate. In another embodiment, the method for the surface coating of an aluminum alloy substrate comprises applying a uniform clear coating layer to the surface of the aluminum alloy substrate and then applying a preceramic resin film to the coated aluminum alloy substrate, where the preceramic resin film is uniformly applied and cured onto the coated aluminum alloy substrate so as to result in a ceramic shell of about 3 microns to about 12 microns in thickness over the coated aluminum alloy substrate.

U.S. Pat. No. 8,419,139 appears to disclose tank wheel assembly systems, methods, and apparatus. In one embodiment, a tank wheel assembly includes a first wheel and a second wheel. A first face of the first wheel faces a second face of the second wheel. A guide tunnel is defined by at least a portion of the first face and at least a portion of the second face. The guide tunnel has outer surfaces and is configured to receive a center guide of a tank tread. The guide tunnel and center guide at least partially maintain the tank tread of the tank wheel assembly. A wear resistant coating is located on at least a portion of the outer surfaces of the guide tunnel, restricts the center guide of the tank tread from abrading the outer surfaces of the guide tunnel, and has a thickness of at least about 0.025 inch.

U.S. Pat. No. 6,881,491 appears to disclose an aluminum alloy article that is cleaned to remove oxides and organic matter from a coatable surface, coated with a composition comprising an organic resin and a fluorine compound, and then heated to an elevated temperature to decompose the organic resin and at least a portion of the fluorine compound. After heating, the coated surface is left with a protective oxyfluoride film that prevents blistering and hydrogen pickup and promotes hydrogen degassing from the article.

U.S. Pat. No. 6,872,425 appears to disclose a method of coating a vehicle wheel to increase wear and corrosion resistance of the vehicle wheel, including the steps of providing a vehicle wheel and applying a wear and corrosion resistant coating onto a surface of the vehicle wheel. The coating is applied to at least a tire bead retaining flange of the vehicle wheel. The coating is of particular use with vehicle wheels made of forged aluminum. The coating is selected from tungsten carbide, optionally including cobalt or chrome, a nickel-based super-alloy, aluminum and silicon carbide, or stainless steel. The coating is typically applied to a thickness of about 0.004-0.01 inches. The surface of the vehicle wheel may be prepared by mechanically abrading the surface or chemically etching the surface of the vehicle wheel. The coating may be applied by cold spraying, thermal spraying, or triboelectric discharge kinetic spraying and other similar processes.

U.S. Pat. No. 6,656,607 appears to disclose a method for producing an anticorrosive coating for metal parts, free of chromium and chromium-based derivatives and in particular hexavalent chromium, preferably to be applied in thin layers while providing highly efficient protection. Said coating consists of the synergistic association of a first metal zinc layer and one or several coating layers obtained by using an aqueous composition containing a particulate metal, an appropriate solvent, a thickening agent and a binder consisting of a silane.

U.S. Pat. No. 5,283,121 appears to disclose a coating comprising a non-porous textured corrosion resistant and abrasion resistant base layer of metal that is applied by a thermal flame spray process using a high-velocity oxy-fuel, and a top coating of a continuous film of fluoropolymer is used to enhance and protect the surface bare metal on industrial rollers in a multitude of industrial environments that are corrosive, abrasive or otherwise have elements present which tend to stick to the roller surface. The corresponding method comprises the steps of providing a body member having a relatively soft and corrodible metal first layer, applying a middle metal layer to the first layer by a high-velocity oxy-fuel type metal thermal spray process, applying an outer layer comprising a fluoropolymer coating over said middle layer to provide a non-sticking characteristic to the coating; and heating said outer layer to a level above the curing temperature of the fluoropolymer so as to bond the fluoropolymer to said middle layer.

U.S. Pat. No. 4,895,887 appears to disclose a coating composition comprising a colloidal silica, a partial condensate of organoalkoxysilane hydrolyzate, a polymer or a copolymer of unsaturated ethylenic monomers, a surface active agent and glycol derivatives, which is coated on a wheel for vehicles shows excellent properties such as adhesive property, filiform corrosion resistance, stain resistance, weather-resistance and impact resistance. A wheel coated with the coating composition for vehicles also shows properties such as filiform corrosion resistance, stain resistance, weather-resistance and impact resistance.

U.S. Pat. No. 4,763,392 appears to disclose a method of manufacturing a rust-proof, leak-proof and air-impervious welded tire rim by providing a pair of rim bodies each of which includes a peripheral bead and at least one of which includes a valve seat defined by an opening and with the rim bodies being welded to each other along an exterior circumferential weld; liquid-cleaning the welded rim; and applying to the entirety of all exposed surfaces of the rim an air-impervious coating of resilient copolymeric material whereby any porosity of the circumferential weld is sealed against air migration and the rim beads and valve seat are all totally coated with a resilient air-impervious coating for effectively sealing against air migration in association with a tire bead and an air valve body, respectively.

While anticorrosion compositions, solutions and associated products disclosed supra have been known in the art for years, issues associated with durability, cost, safety, efficiency, and selection, among others, remain largely problematic and/or unsolved. As such, there remains a genuine demand for novel products, including wheels, that comprise durable and cost effective anticorrosion layers/films enabling, among other things, extended warranties for customers.

These and other objects of the present invention will become apparent in light of the present specification, claims, chemical structures, chemical formulae, and drawings.

SUMMARY OF THE INVENTION

The present invention is directed to a corrosion resistant wheel comprising: (a) a body having an outer surface and an inner surface; (b) a mounting plate having a front surface and a rear surface; (c) a primary anticorrosion layer associated with the inner and/or outer surfaces of the wheel body and/or the front and/or rear surfaces of the mounting plate. An optional secondary layer is preferably associated with the primary anticorrosion layer, and a tertiary layer is preferably associated with the secondary layer.

The present invention is also directed to a method for manufacturing a corrosion resistant wheel adapted for securement to a vehicle and/or trailer comprising the steps of: (1) providing a wheel body having an outer surface and an inner surface, and a mounting plate having a front surface and a rear surface; (2) applying a primary anticorrosion composition to at least one of the inner surface of the wheel body, the outer surface of the wheel body, the front surface of the mounting plate, and the rear surface of the mounting plate, wherein the primary anticorrosion composition comprises: (a) at least one solvent; (b) at least one of $H_2Mg_3(SiO_3)_4$ and $Mg_3Si_4O_{10}(OH)_2$; (c) $Zn_3(PO_4)_2$; (d) at least one of ZnO and chelated Zinc; and (e) a copolymer resin; and (3) forming a primary anticorrosion layer onto the applied surface(s).

In a preferred embodiment of the present invention, the step of providing a wheel body comprises the step of providing a wheel body having an outer surface and an inner surface, and a mounting plate having a front surface and a rear surface, wherein the wheel body comprises steel, stainless steel, aluminum, transition metals, and/or alloys of the same.

In another preferred embodiment of the present invention, the step of applying the primary anticorrosion composition comprises the step of applying the primary anticorrosion composition to the inner surface of the wheel body, the outer surface of the wheel body, the front surface of the mounting plate, and the rear surface of the mounting plate.

In yet another preferred embodiment of the present invention, the primary anticorrosion composition comprises: (a) at least one solvent (e.g., 2-butoxyethanol); (b) at least one of $H_2Mg_3(SiO_3)_4$ and $Mg_3Si_4O_{10}(OH)_2$; (c) $Zn_3(PO_4)_2$; (d) at least one of ZnO and chelated Zinc; and (e) a copolymer resin.

Preferably, the copolymer resin is selected from the group consisting of an acrylate copolymer, an acrylate acetate copolymer, an ethylene ethyl acrylate copolymer, an ethylene butyl acrylate copolymer, an ethylene acrylic acid copolymer, an ethylene methyl acrylate copolymer, an ethylene n-butyl acrylate copolymer, an ethylene vinyl acetate copolymer, a poly(methyl methacrylate-co-methacrylic acid) copolymer, and combinations thereof.

In a preferred embodiment of the present invention, the method for manufacturing a corrosion resistant wheel further comprises the steps of: (1) applying a secondary anticorrosion composition onto a least a portion of the primary anticorrosion layer, wherein the secondary anticorrosion composition comprises: (a) an optional solvent; (b) an optional pigment; (c) n-butyl acetate; (d) xylene, (e) cellulose nitrate plastic scrap; (f) ethyl alcohol; (g) n-butanol; (h) ethylbenzene; (i) n-butyl propionate; (j) alkyd resin based on coconut oil; (k) 1-methoxy-2-propanol; (l) isopentyl acetate; (m) 4-methylpentan-2-one; (n) titanium dioxide; and (o) ethylene-vinyl acetate copolymer; and (2) forming a secondary anticorrosion layer onto at least a portion of the primary anticorrosion layer.

In another preferred embodiment of the present invention, the method for manufacturing a corrosion resistant wheel further comprises the steps of: (1) applying a tertiary anticorrosion composition onto a least a portion of the secondary anticorrosion layer, wherein the tertiary anticorrosion composition comprises: (a) an optional solvent; (b) n-butyl acetate; (c) tert-butyl acetate; (d) 2-methoxy-1-methylethyl acetate; (e) 2-butoxyethyl acetate; (f) diisopropylbenzene; (g) xylene; and (h) ethylbenzene; and (2) forming a tertiary anticorrosion layer onto at least a portion of the secondary anticorrosion layer.

The present invention is further directed to a method for manufacturing a corrosion resistant wheel adapted for securement to a vehicle and/or trailer comprising the steps of: (1) providing a wheel body having an outer surface and an inner surface, and a mounting plate having a front surface and a rear surface; (2) at least one of mechanically abrading and chemically etching at least one of the inner surface of the wheel body, the outer surface of the wheel body, the front surface of the mounting plate, and the rear surface of the mounting plate; (3) applying a primary anticorrosion composition to at least one of the inner surface of the wheel body, the outer surface of the wheel body, the front surface of the mounting plate, and the rear surface of the mounting plate, wherein the primary anticorrosion composition comprises: (a) at least one solvent; (b) at least one of $H_2Mg_3(SiO_3)_4$ and $Mg_3Si_4O_{10}(OH)_2$; (c) $Zn_3(PO_4)_2$; (d) at least one of ZnO and chelated Zinc; and (e) an acrylate copolymer resin; and (4) forming a primary anticorrosion layer onto the applied surface(s).

The present invention is yet further directed to a method for manufacturing a corrosion resistant wheel adapted for securement to a vehicle and/or trailer comprising the steps of: (1) providing a wheel body having an outer surface and an inner surface, and a mounting plate having a front surface and a rear surface; (2) at least one of mechanically abrading and chemically etching at least one of the inner surface of the wheel body, the outer surface of the wheel body, the front surface of the mounting plate, and the rear surface of the mounting plate; (3) applying a primary anticorrosion composition to the inner surface of the wheel body, the outer surface of the wheel body, the front surface of the mounting plate, and the rear surface of the mounting plate, wherein the primary anticorrosion composition comprises: (a) at least one solvent, wherein the at least one solvent comprises 2-butoxyethanol; (b) at least one of $H_2Mg_3(SiO_3)_4$ and $Mg_3Si_4O_{10}(OH)_2$; (c) $Zn_3(PO_4)_2$; (d) at least one of ZnO and chelated Zinc; and (e) an acrylate copolymer resin; (4) forming a primary anticorrosion layer onto the applied surface(s); (5) applying a secondary anticorrosion composition onto a least a portion of the primary anticorrosion layer, wherein the secondary anticorrosion composition comprises: (a) an optional solvent; (b) an optional pigment; (c) n-butyl acetate; (d) xylene, (e) cellulose nitrate plastic scrap; (f) ethyl alcohol; (g) n-butanol; (h) ethylbenzene; (i) n-butyl propionate; (j) alkyd resin based on coconut oil; (k) 1-methoxy-2-propanol; (l) isopentyl acetate; (m) 4-methylpentan-2-one; (n) titanium dioxide; and (o) ethylene-vinyl acetate copolymer; (6) forming a secondary anticorrosion layer onto at least a portion of the primary anticorrosion layer; (7) applying a tertiary anticorrosion composition onto a least a portion of the secondary anticorrosion layer, wherein the tertiary anticorrosion composition comprises: (a) an optional solvent; (b) n-butyl acetate; (c) tert-butyl acetate; (d) 2-methoxy-1-methylethyl acetate; (e) 2-butoxyethyl acetate; (f) diisopropylbenzene; (g) xylene; and (h) ethylbenzene; and (8) forming a tertiary anticorrosion layer onto at least a portion of the secondary anticorrosion layer.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

DETAILED DESCRIPTION OF THE INVENTION

While this invention is susceptible of embodiment in many different forms, there is disclosed and described herein in detail several specific embodiments with the understanding that the present disclosure is to be considered as an exemplification of the principles of the invention and is not intended to limit the invention to the embodiments illustrated. It will be understood that the compounds disclosed herein are intended to comprise all stereochemical configurations regardless of representations.

Figure 1:
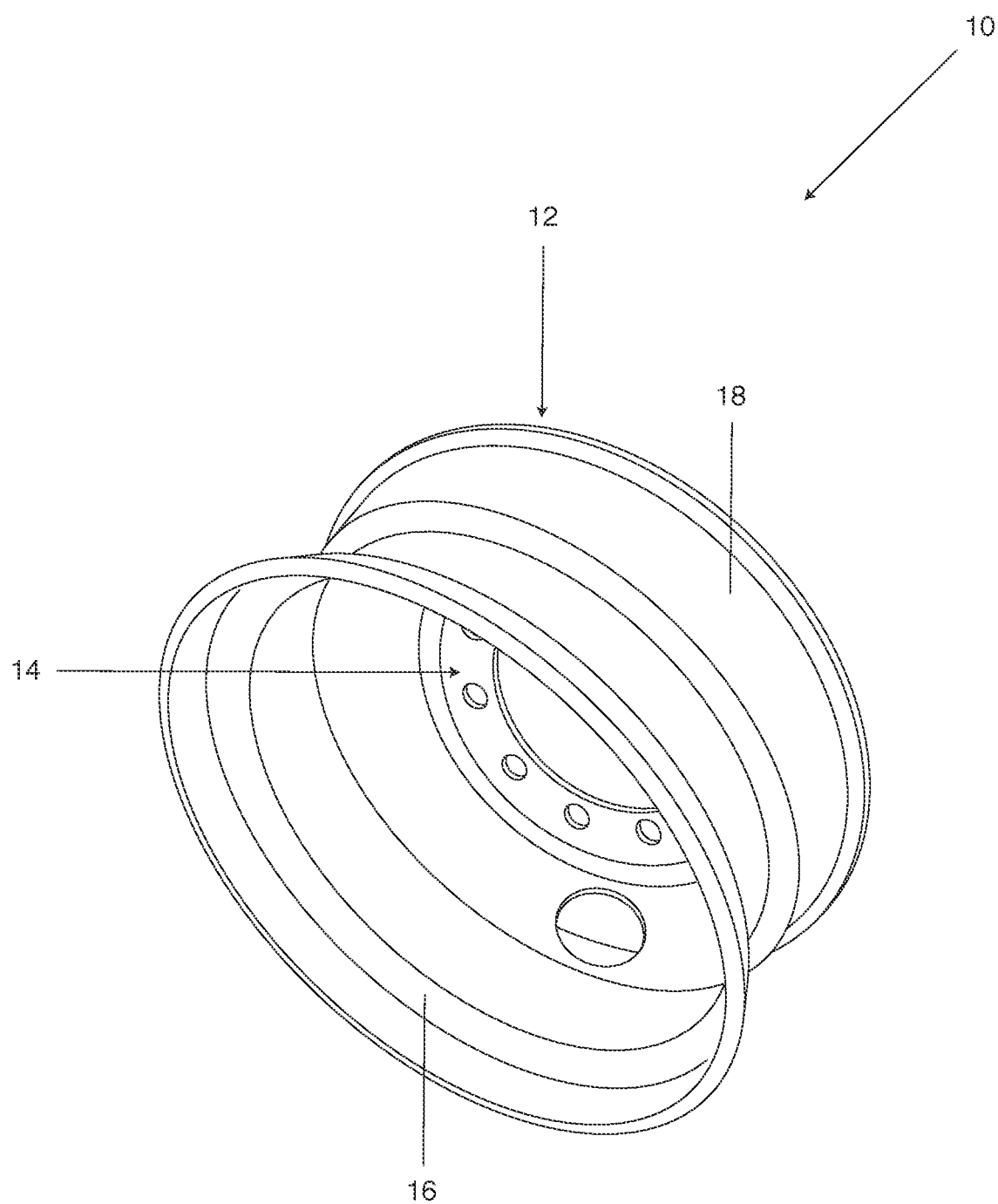
FIG. 1 of the drawings is an isometric view of a wheel manufactured in accordance with the present invention.
Figure 2:
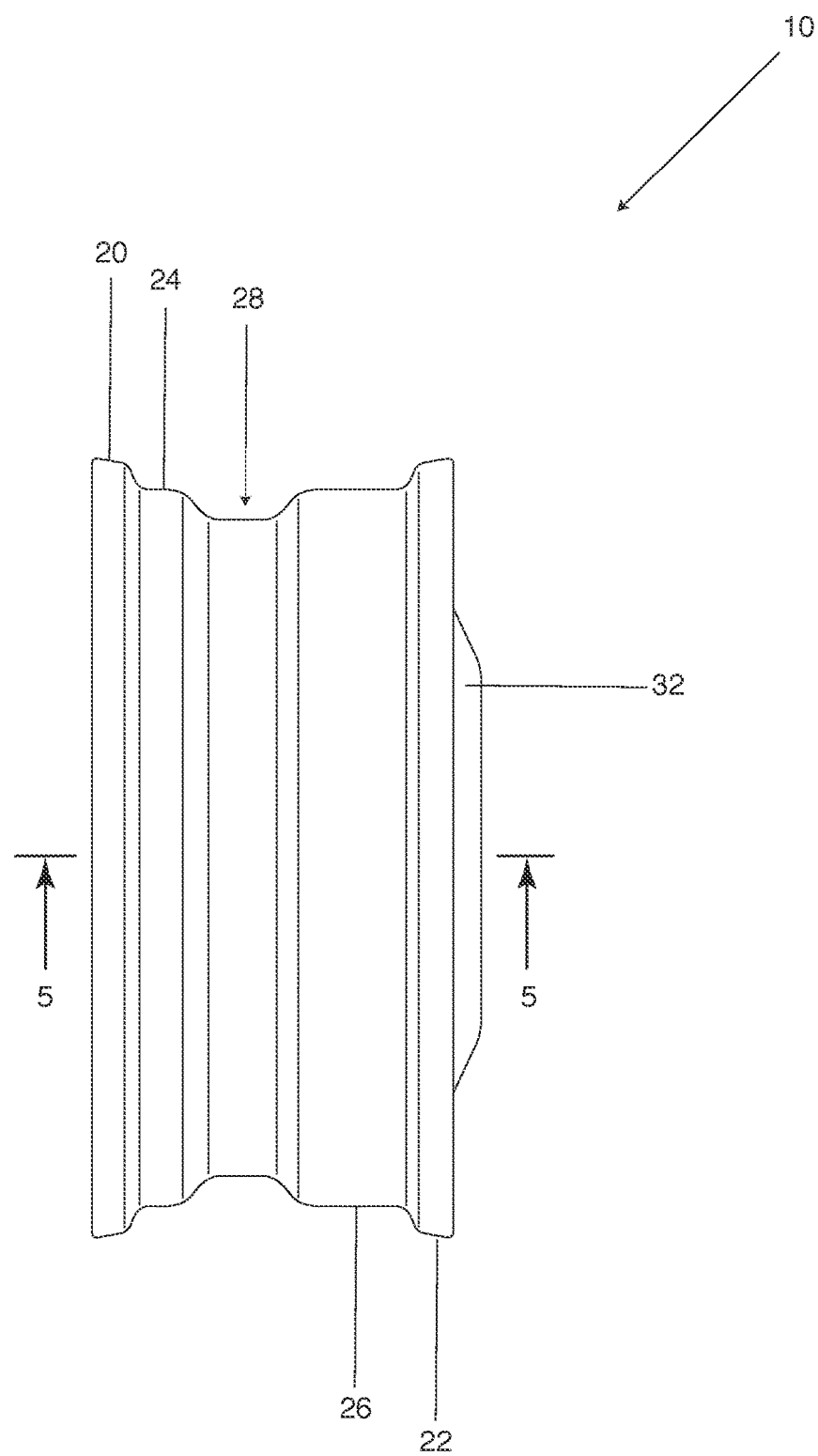
FIG. 2 of the drawings is a side view of a wheel manufactured in accordance with the present invention.
Figure 3:
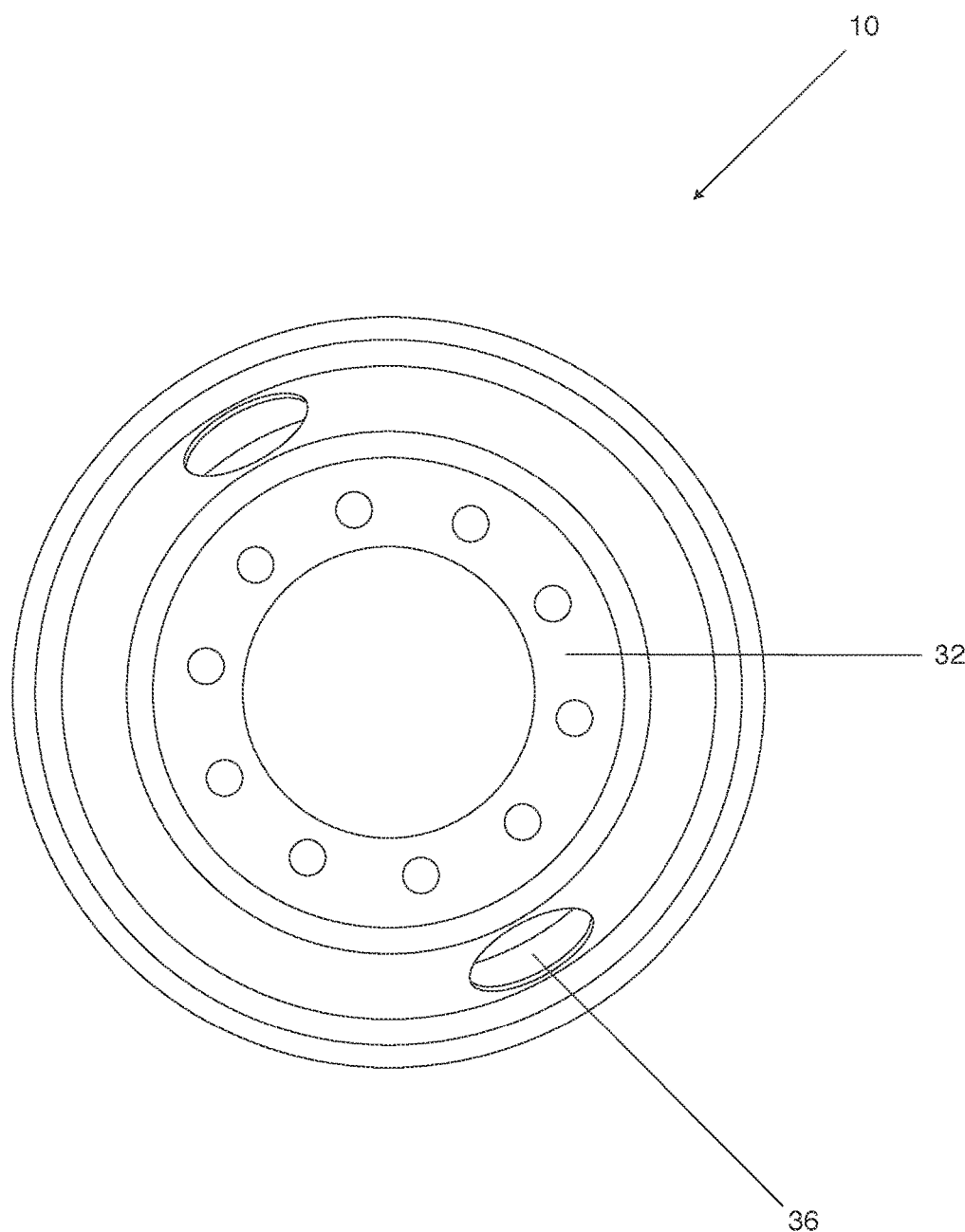
FIG. 3 of the drawings is a rear view, from a deep dish facing perspective, of a wheel manufactured in accordance with the present invention.
Figure 4:
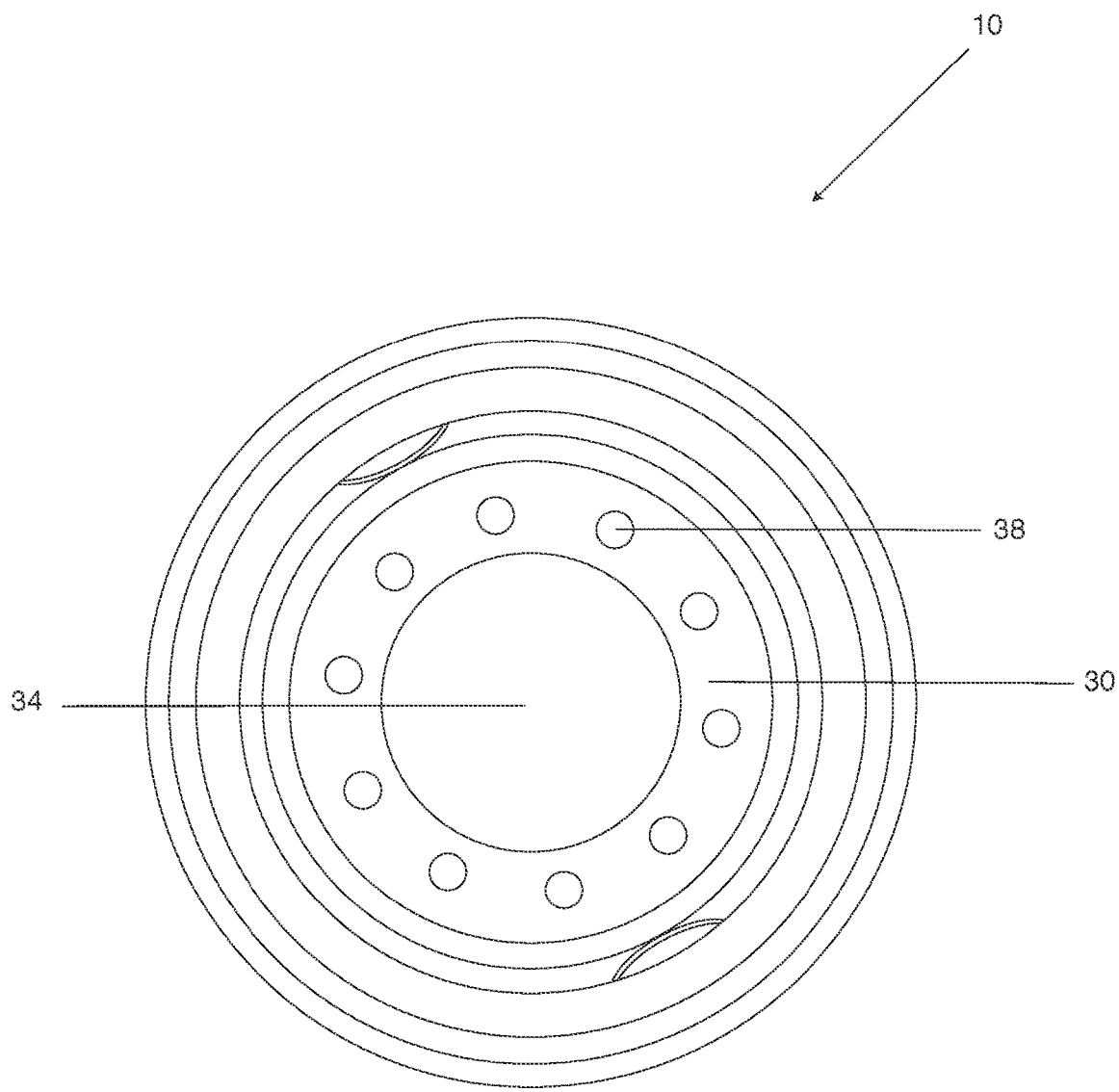
FIG. 4 of the drawings is a front view, from a deep dish facing perspective, of a wheel manufactured in accordance with the present invention.
Figure 5:
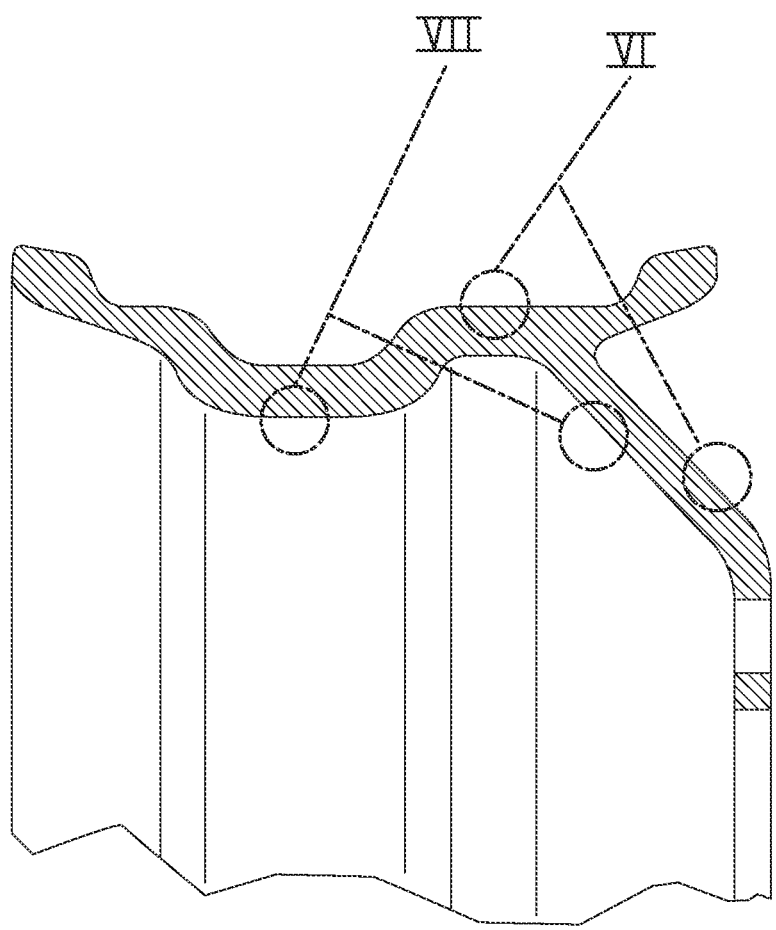
FIG. 5 of the drawings is a cross-sectional view of the wheel of FIG. 2 taken along line 5-5.
Figure 6:
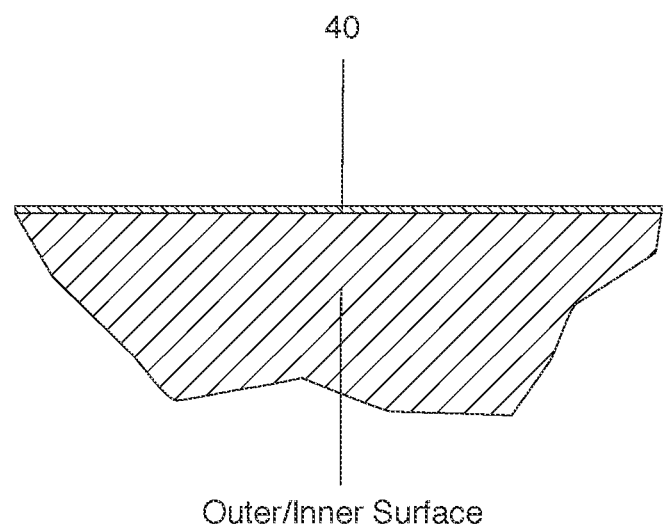
FIG. 6 of the drawings is a magnified representation of a surface of a wheel manufactured in accordance with the present invention.
Figure 7:
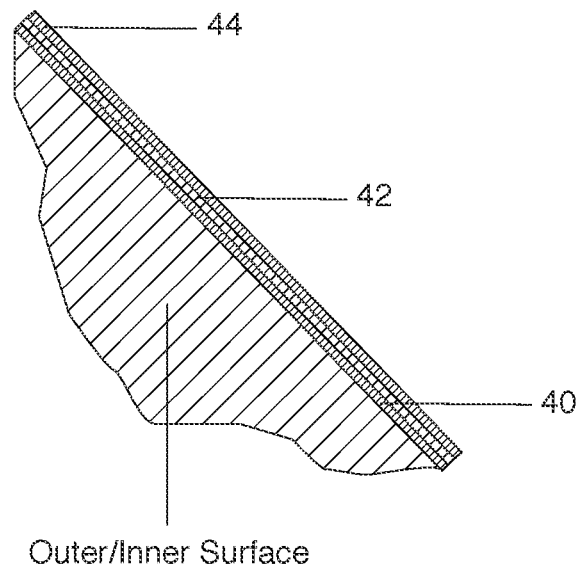
FIG. 7 of the drawings is a magnified representation of a surface of a wheel manufactured in accordance with the present invention.

Referring now to the drawings and to FIGS. 1-7 in particular, wheel 10 (e.g., a 10 hub 22.5×8.25 truck wheel) is shown, which generally comprises annular body or rim 12 and mounting plate or member 14 (e.g., hub mounting plate).

Rim 12 preferably includes inner surface 16, outer surface 18, front flange 20, rear flange 22, front bead seat 24, rear bead seat 26, and well region 28.

Mounting plate/member 14 is secured (e.g., welded) to inner surface 16 of rim 12. Mounting plate 14 preferably includes front surface 30, rear surface 32, center bore or aperture 34, a plurality of valve apertures 36, a plurality of stud/bold apertures 38.

In a preferred embodiment of the present invention, and as is best shown collectively in FIGS. 1, 2, 5, and 6, inner and outer surfaces 16 and 18, respectively, of rim 12 and front and rear surfaces 30 and 32, respectively, of mounting plate 14 include primary anticorrosion layer 40.

In another preferred embodiment of the present invention, and as is best shown collectively in FIGS. 1, 2, 5, and 7, inner surface 16 of rim 12 and front and/or rear surfaces 30 and 32, respectively, of mounting plate 14 optionally include secondary and tertiary layers 42 and 44 (e.g., anticorrosion layers).

In accordance with the present invention annular wheel body 12 is preferably fabricated from steel, stainless steel, aluminum, transition metals, and/or alloys of the same.

Preferably, primary anticorrosion layer 40 is formed from an anticorrosion composition that comprises at least one of an optional solvent, such as, but not limited to, 2-butoxy-ethanol (e.g., approximately 5% to approximately 50% by weight), $H_2Mg_3(SiO_3)_4$ and/or $Mg_3Si_4O_{10}(OH)_2$, (e.g., approximately 10% to approximately 30% by weight), $Zn_3(PO_4)_2$ (e.g., approximately 0.5% to approximately 10% by weight), glycol ether (e.g., approximately 0.5% to approximately 10% by weight), ZnO and/or chelated Zinc (e.g., approximately 0.1% to approximately 5% by weight), and/or a polymeric resin (e.g., approximately 10% to approximately 75% by weight), including, but not limited to, a copolymer resin (e.g., an acrylic resin, an acrylate copolymer, an acrylate acetate copolymer, an ethylene ethyl acrylate copolymer, an ethylene butyl acrylate copolymer, an ethylene acrylic acid copolymer, an ethylene methyl acrylate copolymer, an ethylene n-butyl acrylate copolymer, an ethylene vinyl acetate copolymer, a poly(methyl methacrylate-co-methacrylic acid) copolymer, and combinations thereof). One such anticorrosion composition/layer is commercially available from PRP Industries, Inc. While a specific anticorrosion agent or layer has been disclosed, for illustrative purposes only, as being suitable for the present invention, other anticorrosion agents that would be known to those having ordinary skill in the art having the present disclosure before them are likewise contemplated for use.

In one embodiment of the present invention, secondary layer 42 (e.g., anticorrosion layer) is formed from a composition that comprises one or more of an optional solvent (e.g., approximately 5% to approximately 50% by weight), an optional pigment (e.g., approximately 0.5% to approximately 10% by weight), n-butyl acetate (e.g., approximately 20% to approximately 50% by weight), xylene (e.g., approximately 5% to approximately 40% by weight), cellulose nitrate plastic scrap (e.g., approximately 0.5% to approximately 10% by weight), ethyl alcohol (e.g., approximately 0.5% to approximately 10% by weight), n-butanol (e.g., approximately 0.5% to approximately 10% by weight), ethylbenzene (e.g., approximately 0.5% to approximately 10% by weight), n-butyl propionate (e.g., approximately 0.5% to approximately 10% by weight), alkyd resin, based on coconut oil (e.g., approximately 0.5% to approximately 10% by weight), 1-methoxy-2-propanol (e.g., approximately 0.5% to approximately 10% by weight), isopentyl acetate (e.g., approximately 0.5% to approximately 10% by weight), 4-methylpentan-2-one (e.g., approximately 0.5% to approximately 10% by weight), titanium dioxide (e.g., approximately 0.5% to approximately 10% by weight), acetic acid (e.g., approximately 0.5% to approximately 10% by weight), and/or ethylene-vinyl acetate copolymer (e.g., approximately 0.5% to approximately 10% by weight). Such secondary layers are commercially available from Akzo Nobel Coatings Inc. and/or DuPont. While a specific secondary agent or layer has been disclosed, for illustrative purposes only, as being suitable for the present invention, other secondary agents that would be known to those having ordinary skill in the art having the present disclosure before them are likewise contemplated for use.

In one aspect of the present invention, tertiary layer 44 (e.g., anticorrosion layer) is formed from a composition that comprises one or more of an optional solvent (e.g., approximately 0.5% to approximately 50% by weight), n-butyl acetate (e.g., approximately 10% to approximately 50% by weight), tert-butyl acetate (e.g., approximately 5% to approximately 30% by weight), 2-methoxy-1-methylethyl acetate (e.g., approximately 0.5% to approximately 10% by weight), 2-butoxyethyl acetate (e.g., approximately 0.5% to approximately 10% by weight), diisopropylbenzene (e.g., approximately 0.5% to approximately 10% by weight), xylene (e.g., approximately 0.5% to approximately 10% by weight), and/or ethylbenzene (e.g., approximately 0.1% to approximately 10% by weight). Such tertiary layers are commercially available from Akzo Nobel Coatings Inc and/or DuPont. While a specific tertiary agent or layer has been disclosed, for illustrative purposes only, as being suitable for the present invention, other tertiary agents that would be known to those having ordinary skill in the art having the present disclosure before them are likewise contemplated for use.

In accordance with the present invention, primary anticorrosion layer 40, secondary layer 42, and tertiary layer 44 are associated with annular body 12 and/or mounting plate 14 of wheel 10 via etch coating, dip coating, spin coating, brush coating and/or spray coating—including, but not limited to, cold spraying, thermal spraying, high velocity spraying (e.g., supersonic), low velocity spraying (e.g., subsonic), triboelectric discharge kinetic spraying and other similar processes.

For purposes of the present disclosure, the optional solvents may comprise one or more of any one of a number of common, commercially available solvents, including polar solvents and/or non-polar solvents. Specific examples of preferred solvents include, for example, water, hexane, acetone, methyl ethyl ketone, toluene, benzene, ethers, 3-methylsulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same. While specific solvents have been disclosed, for illustrative purposes only, as being suitable primary solvents, numerous other solvents that would be known to those having ordinary skill in the art having the present disclosure before them are likewise contemplated for use. Indeed, it will be understood that non-liquid or polymer type media are suitable for use in accordance with the present invention. Preferably, the optional solvent is present in a concentration ranging from approximately 1 percent by weight to approximately 99 percent by weight, and more preferably from approximately 50 percent by weight to approximately $99^+$ percent by weight.

It will be understood that any reference to compounds disclosed herein includes salts and/or solvates of the same. It will be further understood that any reference to a layer or film includes the reaction product of reagents of the same.

The present invention is also directed to a method for manufacturing a corrosion resistant wheel adapted for securement to a vehicle and/or trailer comprising the steps of: providing a wheel body having an outer surface and an inner surface, and a mounting plate having a front surface and a rear surface; applying a primary anticorrosion composition to at least one of the inner surface of the wheel body, the outer surface of the wheel body, the front surface of the mounting plate, and the rear surface of the mounting plate, wherein the primary anticorrosion composition comprises: (a) at least one solvent; (b) at least one of $H_2Mg_3(SiO_3)_4$ and $Mg_3Si_4O_{10}(OH)_2$; (c) $Zn_3(PO_4)_2$; (d) at least one of ZnO and chelated Zinc; and (e) a copolymer resin; and forming a primary anticorrosion layer onto the applied surface(s).

In a preferred embodiment of the present invention, the method for manufacturing a corrosion resistant wheel further comprises the steps of: (1) applying a secondary anticorrosion composition onto a least a portion of the primary anticorrosion layer, wherein the secondary anticorrosion composition comprises: (a) an optional solvent; (b) an optional pigment; (c) n-butyl acetate; (d) xylene, (e) cellulose nitrate plastic scrap; (f) ethyl alcohol; (g) n-butanol; (h) ethylbenzene; (i) n-butyl propionate; (j) alkyd resin based on coconut oil; (k) 1-methoxy-2-propanol; (l) isopentyl acetate; (m) 4-methylpentan-2-one; (n) titanium dioxide; and (o) ethylene-vinyl acetate copolymer; and (2) forming a secondary anticorrosion layer onto at least a portion of the primary anticorrosion layer.

In another preferred embodiment of the present invention, the method for manufacturing a corrosion resistant wheel further comprises the steps of: (1) applying a tertiary anticorrosion composition onto a least a portion of the secondary anticorrosion layer, wherein the tertiary anticorrosion composition comprises: (a) an optional solvent; (b) n-butyl acetate; (c) tert-butyl acetate; (d) 2-methoxy-1-methylethyl acetate; (e) 2-butoxyethyl acetate; (f) diisopropylbenzene; (g) xylene; and (h) ethylbenzene; and (2) forming a tertiary anticorrosion layer onto at least a portion of the secondary anticorrosion layer.

The foregoing description merely explains and illustrates the invention and the invention is not limited thereto except insofar as the appended claims are so limited, as those skilled in the art who have the disclosure before them will be able to make modifications without departing from the scope of the invention.

What is claimed and desired to be secured by Letters Patent of the United States is:

1. A method for manufacturing a corrosion resistant wheel adapted for securement to a vehicle and/or trailer, comprising the steps of:

providing a wheel body having an outer surface and an inner surface, and a mounting plate having a front surface and a rear surface, wherein the wheel body comprises steel, stainless steel, aluminum, transition metals, and/or alloys of the same;

at least one of mechanically abrading and chemically etching at least one of the inner surface of the wheel body, the outer surface of the wheel body, the front surface of the mounting plate, and the rear surface of the mounting plate;

applying a primary anticorrosion composition to at least one of the inner surface of the wheel body, the outer surface of the wheel body, the front surface of the mounting plate, and the rear surface of the mounting plate, wherein the primary anticorrosion composition comprises: (a) at least one solvent, wherein the at least one solvent comprises 2-butoxyethanol; (b) at least one of $H_2Mg_3(SiO_3)_4$ and $Mg_3Si_4O_{10}(OH)_2$; (c) $Zn_3(PO_4)_2$; (d) at least one of ZnO and chelated Zinc; and (e) an acrylate copolymer resin, wherein the copolymer resin is selected from the group consisting of an acrylate copolymer, an acrylate acetate copolymer, an ethylene ethyl acrylate copolymer, an ethylene butyl acrylate copolymer, an ethylene acrylic acid copolymer, an ethylene methyl acrylate copolymer, an ethylene n-butyl acrylate copolymer, an ethylene vinyl acetate copolymer, a poly(methyl methacrylate-co-methacrylic acid) copolymer, and combinations thereof; and forming a primary anticorrosion layer onto the applied surface(s);

applying a secondary anticorrosion composition onto a least a portion of the primary anticorrosion layer, wherein the secondary anticorrosion composition comprises: (a) n-butyl acetate; (b) xylene; (c) cellulose nitrate plastic scrap; (d) ethyl alcohol; (e) n-butanol; (f) ethylbenzene; (g) n-butyl propionate; (h) alkyd resin based on coconut oil; (i) 1-methoxy-2-propanol; (j) isopentyl acetate; (k) 4-methylpentan-2-one; (l) titanium dioxide; and (m) ethylene-vinyl acetate copolymer; and forming a secondary anticorrosion layer onto at least a portion of the primary anticorrosion layer.

2. A corrosion resistant wheel manufactured according to claim 1.

* * * * *